US012713504B2

(12) United States Patent
Hooker et al.

(10) Patent No.: US 12,713,504 B2
(45) Date of Patent: Aug. 18, 2026

(54) MICROWAVE WITH CONTROLLED BEVERAGE WARMING

(71) Applicant: Midea Group Co., Ltd., Beijiao (CN)

(72) Inventors: John Kenneth Hooker, Louisville, KY (US); Matthew Melton, Fisherville, KY (US); Rob Bultman, Louisville, KY (US)

(73) Assignee: MIDEA GROUP CO., LTD., Beijiao (CN)

(*) Notice: Subject to any disclaimer, the term of this patent is extended or adjusted under 35 U.S.C. 154(b) by 925 days.

(21) Appl. No.: 17/937,247

(22) Filed: Sep. 30, 2022

(65) Prior Publication Data

US 2024/0114603 A1 Apr. 4, 2024

(51) Int. Cl.
*H05B 6/68* (2006.01)
*H05B 6/64* (2006.01)
*H05B 6/78* (2006.01)

(52) U.S. Cl.
CPC ........... *H05B 6/6455* (2013.01); *H05B 6/687* (2013.01); *H05B 6/782* (2013.01); *H05B 2206/04* (2013.01)

(58) Field of Classification Search
CPC ............................ H05B 6/6411; H05B 6/6455
See application file for complete search history.

(56) References Cited

U.S. PATENT DOCUMENTS 4,376,131 A * 3/1983 Mori ...................... G01N 33/02 426/523
5,451,751 A 9/1995 Takimoto et al.
5,652,710 A 7/1997 Fujii et al.
5,796,081 A 8/1998 Carlsson et al.
5,897,207 A 4/1999 Hartmann
6,559,882 B1 5/2003 Kerchner
7,501,608 B2 3/2009 Hallgren et al.
8,142,375 B2 * 3/2012 Gaspard .................. A61B 5/11 606/1
8,207,479 B2 6/2012 Ben-shmuel et al.
8,563,059 B2 10/2013 Luckhardt et al.
(Continued)

FOREIGN PATENT DOCUMENTS

CN 1311415 A * 9/2001 ............. H05B 6/725
CN 103512058 A 1/2014
(Continued)

OTHER PUBLICATIONS

Calvetti, Frederick F., United States Patent and Trademark Office, Final Office Action issued in U.S. Appl. No. 16/834,503, 135 pages, dated Jan. 21, 2025.
(Continued)

*Primary Examiner* — Woody A Lee, Jr.
(74) *Attorney, Agent, or Firm* — Gray Ice Higdon

(57) ABSTRACT

A microwave cooking appliance performs controlled beverage warming using a temperature sensor to capture a thermal image of a beverage in a cooking cavity. One or more sensing locations within the thermal image that are suitable for determining the temperature of the beverage are determined in part by ordering temperature readings from the thermal image by temperature to determine a temperature function and then determining locations in the thermal image that correspond to the beverage by calculating a derivative function over at least a portion of the temperature function.

20 Claims, 5 Drawing Sheets

(56) References Cited

U.S. PATENT DOCUMENTS

| | | | | |
|---|---|---|---|---|
| 8,839,527 | B2 | 9/2014 | Ben-shmuel et al. | |
| 9,155,405 | B2 | 10/2015 | Artwohl et al. | |
| 9,215,756 | B2 | 12/2015 | Bilchinsky et al. | |
| 10,009,957 | B2 | 6/2018 | Pereira et al. | |
| 10,057,946 | B2 | 8/2018 | Mills et al. | |
| 10,219,330 | B2 | 2/2019 | Pereira | |
| 10,228,145 | B2 * | 3/2019 | Erbe | F24C 7/085 |
| 10,271,388 | B2 | 4/2019 | Hallgren et al. | |
| 10,687,395 | B2 | 6/2020 | Bilchinsky et al. | |
| 10,819,905 | B1 * | 10/2020 | Liu | H04N 23/80 |
| 11,009,238 | B2 | 5/2021 | Neal | |
| 11,022,322 | B2 | 6/2021 | Clayton et al. | |
| 11,058,132 | B2 | 7/2021 | Wang | |
| 11,213,158 | B2 | 1/2022 | Baldwin et al. | |
| 11,221,145 | B2 | 1/2022 | Bhogal et al. | |
| 11,252,792 | B2 | 2/2022 | Seddik et al. | |
| 11,284,742 | B2 | 3/2022 | Grimaldi et al. | |
| 11,388,788 | B2 | 7/2022 | Denker et al. | |
| 2003/0127451 | A1 | 7/2003 | Lile | |
| 2005/0258171 | A1 | 11/2005 | Witt | |
| 2005/0265423 | A1 | 12/2005 | Mahowald et al. | |
| 2009/0236334 | A1 | 9/2009 | Ben-shmuel et al. | |
| 2009/0236335 | A1 | 9/2009 | Ben-shmuel et al. | |
| 2010/0026749 | A1 * | 2/2010 | Kagata | B41J 2/16552 347/14 |
| 2010/0115785 | A1 | 5/2010 | Ben-shmuel et al. | |
| 2010/0176123 | A1 | 7/2010 | Mihara | |
| 2012/0179742 | A1 * | 7/2012 | Acharya | H04N 21/23116 709/202 |
| 2014/0203012 | A1 | 7/2014 | Corona et al. | |
| 2014/0318388 | A1 | 10/2014 | Kim et al. | |
| 2015/0289324 | A1 | 10/2015 | Rober et al. | |
| 2015/0379905 | A1 | 12/2015 | Kawasaki-hedges et al. | |
| 2016/0029441 | A1 | 1/2016 | Taylor et al. | |
| 2016/0192446 | A1 | 6/2016 | Seddik | |
| 2016/0217417 | A1 | 7/2016 | Ma et al. | |
| 2016/0345390 | A1 | 11/2016 | Corona et al. | |
| 2017/0280515 | A1 | 9/2017 | Imai et al. | |
| 2017/0323481 | A1 | 11/2017 | Tran et al. | |
| 2018/0092486 | A1 * | 4/2018 | Kwon | A47J 27/002 |
| 2018/0220500 | A1 | 8/2018 | Staton et al. | |
| 2019/0014625 | A1 * | 1/2019 | Matsui | H05B 6/687 |
| 2019/0230749 | A1 | 7/2019 | Eindecker et al. | |
| 2019/0234617 | A1 * | 8/2019 | Bhogal | F24C 3/124 |
| 2020/0085082 | A1 | 3/2020 | Tran | |
| 2020/0205247 | A1 | 6/2020 | Scott et al. | |
| 2020/0397177 | A1 | 12/2020 | Walsh et al. | |
| 2021/0307135 | A1 * | 9/2021 | Hooker | H05B 6/686 |
| 2021/0360752 | A1 * | 11/2021 | Parhar | D06F 34/18 |
| 2021/0360753 | A1 | 11/2021 | Hua | |
| 2022/0039219 | A1 | 2/2022 | Givens et al. | |
| 2022/0061134 | A1 | 2/2022 | Chun | |

FOREIGN PATENT DOCUMENTS

| | | | | |
|---|---|---|---|---|
| CN | 107105130 | A | 8/2017 | |
| CN | 207751025 | U | 8/2018 | |
| EP | 0078325 | A1 * | 5/1983 | H05B 6/6435 |
| EP | 0467625 | A2 | 1/1992 | |
| EP | 0781072 | A1 | 6/1997 | |
| EP | 1028604 | A2 | 8/2000 | |
| EP | 2528415 | A2 | 11/2012 | |
| EP | 2127482 | B1 | 4/2014 | |
| EP | 3209012 | A1 | 8/2017 | |
| EP | 3672365 | A1 | 6/2020 | |
| JP | 2001165443 | A | 6/2001 | |
| JP | 5064924 | B2 | 10/2012 | |
| JP | 2014109421 | A | 6/2014 | |
| JP | 2020518780 | A | 6/2020 | |
| KR | 20150049026 | A | 5/2015 | |
| KR | 20190051861 | A | 5/2019 | |
| WO | 2015196218 | A1 | 12/2015 | |
| WO | 2018077722 | | 5/2018 | |
| WO | 2019052929 | A1 | 3/2019 | |
| WO | 2019101528 | A1 | 5/2019 | |
| WO | 2019218685 | A1 | 11/2019 | |
| WO | 2020128025 | A1 | 6/2020 | |
| WO | 2022046862 | A1 | 3/2022 | |

OTHER PUBLICATIONS

Calvetti, Frederick F.; United States Patent and Trademark Office; Office Action issued in U.S. Appl. No. 16/834,503, dated Feb. 15, 2023.

Khan, Tareq, An Intelligent Microwave Oven with Thermal Imaging and Temperature Recommendation Using Deep Learning, MDPI Journal, 17 pages, dated Dec. 23, 2019.

Khan, Tareq, Towards an Autonomous Temperature Feedback Microwave Oven with Thermal Imaging, IEEE, 2018.

Khan, Tareq, Smart Microwave Oven with Image Classification and Temperature Recommendation Algorithm, 2018 Institute of Advanced Engineering and Science, 2018.

Johnsen, Stuart et al., Microwave Oven with a Thermal Camera: Solving the Cold Spot Problem, 2015.

Liyan, Cui et al., Temperature Monitoring Based on Image Processing for Intelligent Microwave Heating, 27th Chinese Control and Decision Conference, IEEE, 2015.

Related Applications Transmittal dated Sep. 30, 2022.

Calvetti, Frederick F., United States Patent and Trademark Office, Non-Final Office Action issued in U.S. Appl. No. 16/834,503, 96 pages, dated Sep. 19, 2024.

* cited by examiner

MICROWAVE WITH CONTROLLED BEVERAGE WARMING

BACKGROUND

Microwave cooking appliances are commonly used for residential cooking, and operate by heating and cooking a food or beverage through the generation of electromagnetic radiation within a specific range of frequencies (referred to herein as microwave radiation) that causes water, fat and other substances in the food or beverage to absorb energy via dielectric heating. Microwave cooking is relatively uniform and quick, although due to the sometimes uneven distribution of microwave radiation in a cooking cavity, many microwave cooking appliances incorporate turntables that rotate the food or beverage to more evenly expose the food or beverage to the microwave radiation.

Microwave cooking appliances generally incorporate a microwave power generator for generating the microwave radiation, which may include a power supply and a magnetron that is driven by the power supply to generate the microwave radiation. Many microwave cooking appliances also incorporate multiple output levels to control the rate of heating or cooking a food and/or beverage. Some designs utilize a fixed microwave power generator that outputs a constant output power of microwave radiation, and that is cycled on and off every few seconds in order to support the multiple output levels, while other designs utilize a variable microwave power generator that incorporates an inverter power supply to provide relatively continuous heating at multiple output levels.

Some foods and/or beverages present challenges to conventional microwave cooking appliances. For example, individuals may desire to heat or reheat beverages to a temperature sufficient for consumption, but without overheating the beverage or causing it to reach its boiling point and spill out of its container. In addition, different individuals may have different preferences for temperature, so a temperature that is preferred by one individual may not necessarily be suitable for another individual.

Accordingly, a need continues to exist in the art for a manner of controlling a microwave cooking appliance to more reliably heat or reheat beverages to a desired temperature.

SUMMARY

The herein-described embodiments address these and other problems associated with the art by providing a microwave cooking appliance that performs controlled beverage warming using a temperature sensor to capture a thermal image of a beverage in a cooking cavity. One or more sensing locations within the thermal image that are suitable for determining the temperature of the beverage are determined in part by ordering temperature readings from the thermal image by temperature to determine a temperature function and then determining locations in the thermal image that correspond to the beverage by calculating a derivative function over at least a portion of the temperature function.

Therefore, consistent with one aspect of the invention, a microwave cooking appliance may include an enclosure including a cooking cavity configured to receive a beverage, a microwave power generator configured to generate microwave energy for heating the beverage received in the cooking cavity, a temperature sensor configured to sense temperature within the cooking cavity, and a controller coupled to the microwave power generator and the temperature sensor and configured to perform a cycle to heat the beverage received in the cooking cavity. The controller is configured to, in association with performing the cycle, determine one or more sensing locations of the beverage received in the cooking cavity by receiving a thermal image captured by the temperature sensor, the thermal image including temperature data representing a plurality of temperature readings for a plurality of locations within a field of view of the temperature sensor, determining a temperature function for the thermal image by ordering the plurality of temperature readings by temperature, determining a subset of the plurality of locations corresponding to the beverage by calculating a derivative function over at least a portion of the temperature function, and selecting the one or more sensing locations from the determined subset of the plurality of locations corresponding to the beverage.

Moreover, in some embodiments, the controller is further configured to determine an additional subset of the plurality of locations corresponding to a beverage container within which the beverage is contained in the cooking cavity using the calculated derivative function. Further, in some embodiments, the plurality of temperature readings of the thermal image are arranged in a two-dimensional array, and the controller orders the plurality of temperature readings by temperature by arranging the plurality of temperature readings into a one-dimensional array. Also, in some embodiments, the controller is configured to determine the subset of the plurality of locations corresponding to the beverage by determining a beverage criterion using the calculated derivative function and assigning each location in the plurality of locations having a temperature reading that meets the beverage criterion to the subset of the plurality of locations corresponding to the beverage.

Further, in some embodiments, the controller is configured to determine the beverage criterion by identifying a region of greatest rate of change in the calculated derivative function. In some embodiments, the controller is configured to determine the beverage criterion further by identifying a temperature within the identified region of greatest rate of change in the calculated derivative function. Also, in some embodiments, the controller is further configured to determine a geometric center of the subset of the plurality of locations corresponding to the beverage and to select the one or more sensing locations by selecting a center location corresponding to the determined geometric center. In some embodiments, the controller is further configured to determine one or more adjacent locations to the determined center location and to select the one or more sensing locations by selecting the determined one or more adjacent locations. Further, in some embodiments, the controller is configured to determine the temperature function further by averaging each temperature reading with one or more adjacent temperature readings after ordering the plurality of temperature readings by temperature.

Consistent with another aspect of the invention, a microwave cooking appliance may include an enclosure including a cooking cavity configured to receive a beverage, a microwave power generator configured to generate microwave energy for heating the beverage received in the cooking cavity, a temperature sensor configured to capture thermal images of the cooking cavity and to output, for each thermal image, temperature data representing a plurality of temperature readings for a plurality of locations within a field of view of the temperature sensor, and a controller coupled to the microwave power generator and the temperature sensor. The controller is configured to perform a cycle to heat the beverage received in the cooking cavity by receiving a first thermal image captured by the temperature sensor, attempting to determine one or more sensing locations corresponding to the beverage from among the plurality of locations of the first thermal image using the temperature data for the first thermal image, in response to successfully determining the one or more sensing locations, activating the microwave power generator for one or more phases to heat the beverage to a predetermined temperature and monitoring a current temperature of the beverage by receiving a second thermal image captured by the temperature sensor and determining the current temperature for the beverage using the temperature readings in the second thermal image corresponding to the determined one or more sensing locations, and in response to unsuccessfully determining the one or more sensing locations, activating the microwave power generator to heat the beverage for a predetermined duration, receiving a third thermal image captured by the temperature sensor after activating the microwave power generator to heat the beverage for the predetermined duration, and determining the one or more sensing locations corresponding to the beverage from among the plurality of locations of the third thermal image using the temperature data for the first thermal image.

In some embodiments, the controller is configured to attempt to determine the one or more sensing locations corresponding to the beverage from among the plurality of locations of the first thermal image using the temperature data for the first thermal image by attempting to determine a first region of locations in the first thermal image having temperature readings above ambient temperature, in response to successfully determining the first region of locations in the first thermal image having temperature readings above ambient temperature, determining the one or more sensing locations corresponding to the beverage from the first region of locations, and in response to unsuccessfully determining the first region of locations in the first thermal image having temperature readings above the ambient temperature, attempting to determine a second region of locations in the first thermal image having temperature readings below ambient temperature and determining the one or more sensing locations corresponding to the beverage from the second region of locations.

Further, in some embodiments, the microwave cooking appliance further includes a turntable, and the controller is configured to capture each of the first, second and third thermal images when the turntable is in substantially the same rotational position. Also, in some embodiments, the controller is configured to activate the microwave power generator for the one or more phases by, during a first phase of the one or more phases, activating the microwave power generator for a duration corresponding to one or more full rotations of the turntable. In addition, in some embodiments, the controller is configured to select the duration and an output level for activating the microwave power generator during the first phase based upon an initial temperature determined for the beverage.

In some embodiments, the controller is configured to attempt to determine the one or more sensing locations corresponding to the beverage by determining a temperature function for the first thermal image by ordering the plurality of temperature readings by temperature, determining a subset of the plurality of locations corresponding to the beverage by calculating a derivative function over at least a portion of the temperature function, and selecting the one or more sensing locations from the determined subset of the plurality of locations corresponding to the beverage.

In addition, in some embodiments, the controller is configured to determine the subset of the plurality of locations corresponding to the beverage by determining a beverage criterion using the calculated derivative function and assigning each location in the plurality of locations having a temperature reading that meets the beverage criterion to the subset of the plurality of locations corresponding to the beverage. Also, in some embodiments, the controller is configured to determine the beverage criterion by identifying a region of greatest rate of change in the calculated derivative function and identifying a temperature within the identified region of greatest rate of change in the calculated derivative function.

In addition, in some embodiments, the controller is further configured to determine a geometric center of the subset of the plurality of locations corresponding to the beverage and to select the one or more sensing locations by selecting a center location corresponding to the determined geometric center. In some embodiments, the controller is further configured to determine one or more adjacent locations to the determined center location and to select the one or more sensing locations by selecting the determined one or more adjacent locations. Further, in some embodiments, the controller is configured to determine the temperature function further by averaging each temperature reading with one or more adjacent temperature readings after ordering the plurality of temperature readings by temperature.

Other embodiments may include various methods for making and/or using any of the aforementioned constructions.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
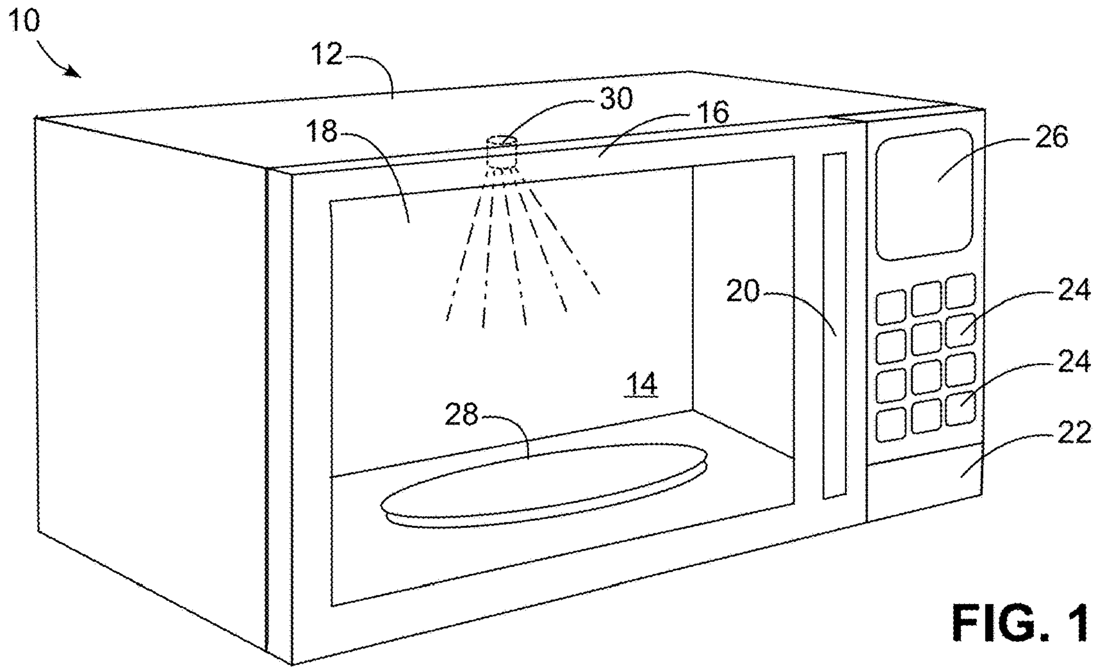
FIG. 1 is a perspective view of a microwave cooking appliance consistent with some embodiments of the invention.

Turning now to the drawings, wherein like numbers denote like parts throughout the several views, FIG. 1 illustrates an example microwave cooking appliance 10 in which the various technologies and techniques described herein may be implemented. Microwave cooking appliance 10 is a residential-type microwave cooking appliance, and as such includes a housing or enclosure 12, which further includes a cooking cavity 14, as well as a door 16 disposed adjacent the respective opening of the cooking cavity 14. In some embodiments, the door 16 may further include a window 18 that allows a user to view the items inside the cooking cavity 14 and a handle 20. In other embodiments, in place of, or in addition, to the handle 20, the microwave cooking appliance 10 may include a button 22 that a user may press to trigger the opening of the door 16.

The microwave cooking appliance 10 may also include one or more user activated controls 24, which may be in the form of buttons, knobs, a touchscreen, or the like. In some embodiments, these user activated controls 24 may be used to program a cooking time and/or a cooking power level. In addition, in some embodiments, these user activated controls 24 may be used to select one or more preset conditions for a particular food or beverage to be cooked or a particular desired action (e.g. "coffee", "corn", "cocoa", etc.). The microwave cooking appliance 10 may also include a display 26, which may be used to convey a variety of information to a user. For example, in some embodiments, the display 26 may be used to display the time when the microwave cooking appliance 10 is not in use. In other embodiments, the display 26 may be used to display cooking times, power levels and/or temperatures.

Microwave cooking appliance 10 may also include a rotatable turntable 28 that is configured to support foods or beverages to be heated. In some embodiments, the turntable 28 may be positioned centrally in the cooking cavity 14, although this is not intended to be limiting. One or more foods or beverages may be placed on turntable 28, so that as the turntable rotates so do the one or more food or beverages contained thereon. This rotation may facilitate more even heating (or cooking) of the food(s) or beverage(s). In some instances, such a turntable may be configured to be turned on, off, or otherwise controlled (e.g. rotational speed) in response to various user inputs.

In addition, microwave cooking appliance 10 also includes a temperature sensor 30, which in the illustrated embodiments may be used to sense one or more temperatures in cooking cavity 14. In some instances, a temperature sensor may be a non-contact temperature sensor (e.g., an infrared (IR) thermal sensor) disposed on or within a top wall of cavity 14 as illustrated in FIG. 1, with a field of view directed downwardly and thus towards a top surface of any food or beverage disposed in the cooking cavity. Other positions, e.g., on a sidewall or in a corner of cooking cavity 14, may also be used in other embodiments. In some embodiments, other types of temperature sensors may be used, including temperature probes and other types of contact temperature sensors that require direct contact with the food or beverage.

As will become more apparent below, however, in many embodiments it may be desirable to implement temperature sensor 30 using one or more thermal cameras, also referred to as thermal imaging devices, capable of generating thermal images or scans having one, two, or three dimensional arrays of temperature readings over field of views thereof. A thermal camera may include an array of thermal sensors capable of detecting various infrared wavelengths, e.g., infrared waves, far-infrared waves, long wave infrared waves, within a field of view of the thermal camera. An example thermal image generated by a thermal camera (such as a Melexis MLX90640ESF-BAA) includes 768 data values distributed in a 32×24 two dimensional array representing the field of view of the thermal camera. The data values each represent a location in the field of view of the thermal camera, and may be considered to include a temperature reading corresponding to the temperature sensed at the represented location. Other thermal cameras may be used in other embodiments.

Figure 2:
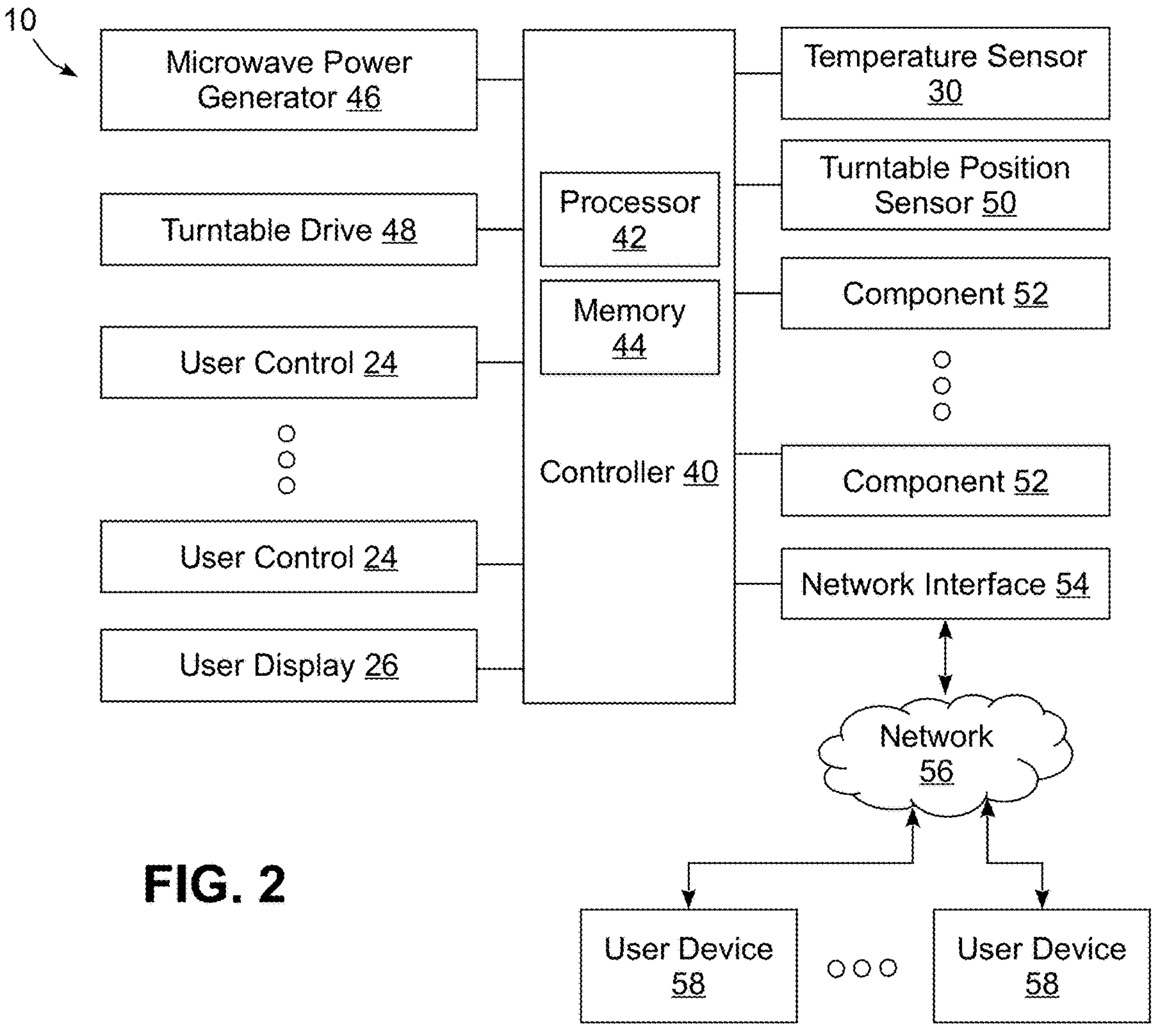
FIG. 2 is a block diagram of an example control system for the microwave cooking appliance of FIG. 1.

A microwave cooking appliance consistent with the invention also generally includes one or more controllers configured to control the application of cooking energy to a food or beverage disposed in the appliance, and otherwise perform various cooking or heating cycles at the direction of a user. FIG. 2, for example, illustrates an example embodiment of a controller 40 for microwave cooking appliance 10 that receives inputs from a number of components and drives a number of components in response thereto. Controller 40 may, for example, include one or more processors 42 and a memory 44 within which may be stored program code for execution by the one or more processors. The memory may be embedded in controller 40, but may also be considered to include volatile and/or non-volatile memories, cache memories, flash memories, programmable read-only memories, read-only memories, etc., as well as memory storage physically located elsewhere from controller 40, e.g., in a mass storage device or on a remote computer interfaced with controller 40.

As shown in FIG. 2, controller 40 may be interfaced with various components, including the aforementioned user controls 24 for receiving user input (which may be implemented in various embodiments using various combinations of switches, knobs, buttons, sliders, touchscreens or touch-sensitive displays, microphones or audio input devices, image capture devices, etc.), user display 26 (which may be implemented in various embodiments using various indicators, graphical displays, textual displays, speakers, etc.), and temperature sensor 30. Further, as illustrated in FIG. 2, controller 40 may be interfaced with a microwave power generator 46, which may include a power supply and a magnetron, and which in some embodiments may be implemented as a fixed power microwave power generator that is cycled in order to provide different output levels, and in other embodiments may be implemented as a variable power microwave power generator that utilizes an inverter power supply that varies an output power of the microwave power generator in order to provide different output levels.

In addition, in some embodiments controller 40 may be interfaced with a turntable drive 48 and a turntable position sensor 50, the former of which is used to rotate the turntable, and the latter of which is used to sense a rotational position of the turntable. Sensor 50 in some embodiments may be capable of sensing multiple rotational positions of the turntable (e.g., utilizing an encoder or multiple position detectors), while in other embodiments, sensor 50 may be capable of sensing a single rotational position (e.g., a home position) to enable the turntable to be stopped at the same position every time (e.g., when attempting to capture thermal scans of the turntable with the food or beverage thereon at the same rotational orientation). In other embodiments, a camera, or even temperature sensor 30, may be used to sense the rotational position of the turntable. Further, in some embodiments no separate sensor 50 may be used, e.g., where the rotational rate of the turntable is known, such that the turntable may be stopped approximately at a particular position based upon a timer (e.g., with a rotational rate of X seconds per revolution, stopping the turntable after X seconds would correspond to a full rotation of the turntable).

Controller 40 may also be interfaced with various additional components 52 suitable for use in a microwave cooking appliance, e.g., lights, fans, indicators, door switches, etc., among others. In addition, in some embodiments, microwave cooking appliance 10 may be a "smart" appliance with network connectivity, and controller 40 may be coupled to one or more network interfaces 54, e.g., for interfacing with external devices via wired and/or wireless networks such as Ethernet, Wi-Fi, Bluetooth, NFC, optical, cellular and other suitable networks, collectively represented in FIG. 2 at 56. Network 56 may incorporate in some embodiments a home automation network, and various communication protocols may be supported, including various types of home automation communication protocols. In some embodiments, microwave cooking appliance 10 may also be interfaced with one or more user devices 58 over network 56, e.g., computers, laptops, tablets, smart phones, wearable devices, personal digital assistants, automated assistants, etc., and through which microwave cooking appliance 10 may be controlled and/or microwave cooking appliance 10 may provide user feedback.

In some embodiments, controller 40 may operate under the control of an operating system and may execute or otherwise rely upon various computer software applications, components, programs, objects, modules, data structures, etc. In addition, controller 40 may also incorporate hardware logic to implement some or all of the functionality disclosed herein. Further, in some embodiments, the sequences of operations performed by controller 40 to implement the embodiments disclosed herein may be implemented using program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the microwave cooking appliance illustrated in FIGS. 1-2 will be apparent to one of ordinary skill in the art, as will become apparent from the description below. Therefore, the invention is not limited to the specific implementations discussed herein.

Embodiments consistent with the invention, as mentioned above, are directed in part to a microwave cooking appliance and method for operating the same to heat or warm a beverage. In some embodiments, a dedicated "beverage warming" cycle may be supported, although the invention is not so limited. Further, in some embodiments, a user may be permitted to select a desired temperature to which the beverage should be warmed, while in other embodiments, a default temperature may be used for such a cycle.

In these embodiments, a temperature sensor that captures thermal images is used to monitor the current temperature of the beverage during a beverage warming cycle. One challenge with the use of such a temperature sensor, however, is determining where the beverage is located in the field of view of the temperature sensor, as it generally cannot be assumed that a user will place a beverage exactly in the center of the appliance every time. As such, in some embodiments, a beverage detection process is utilized to automatically determine one or more locations (also referred to herein as pixels) in a thermal image, hereinafter referred to as sensing locations, that may be suitable for use in determining a current temperature of a beverage placed in a cooking cavity of a microwave cooking appliance.

In some embodiments of the invention, a beverage detection process utilizes a derivative function to determine a beverage criterion that can be used to discriminate between locations in a thermal image that correspond to a beverage and locations in the thermal image that correspond to the cooking cavity and/or to a container within which the beverage is contained. In particular, and as will be described in greater detail below, a beverage detection process may determine one or more sensing locations for a beverage in a thermal image by ordering the plurality of temperature readings by temperature to determine a temperature function for the thermal image, determining a subset of locations from the thermal image that correspond to the beverage by calculating a derivative function over at least a portion of the temperature function, and then selecting one or more sensing locations from the determined subset of locations, e.g., by selecting one or more locations proximate the geometric center of the determined subset of locations.

The temperature and derivative functions are used in part to determine a beverage criterion that may be used to discriminate between locations that correspond to a beverage and locations that correspond to the cooking cavity. In some embodiments, the temperature and derivative functions may also be used to determine which locations correspond to the container in which a beverage is contained. A beverage criterion in some embodiments may define a predetermined temperature such that any location having a temperature reading that is greater than (or greater than or equal to) the predetermined temperature is determined to correspond to the beverage, while any location having a temperature reading that is less than (or less than or equal to) the predetermined temperature is determined to correspond to the cooking cavity. In other embodiments, other beverage criteria may be used, and in some embodiments, an additional container criterion may be used to determine which locations should be considered to correspond to a container.

A temperature function, in this regard, may be considered to be any type of function that is capable of representing the temperature readings captured in a thermal image, and from which a derivative may be calculated over. In the illustrated embodiment, a temperature function may be formed in part by ordering the temperature readings by temperature, e.g., from highest to lowest or from lowest to highest, and typically in a one-dimensional array. Further, in some embodiments, a temperature function may also be formed by performing an averaging operation over the ordered temperature readings, e.g., to average each temperature reading with one or more of its neighboring readings in the one-dimensional array. A temperature function may, in some instances, simply be an ordered set of temperature readings, while in other instances, various curve fitting techniques may be used to generate a mathematic approximation of the ordered set of temperature readings.

Figure 3:
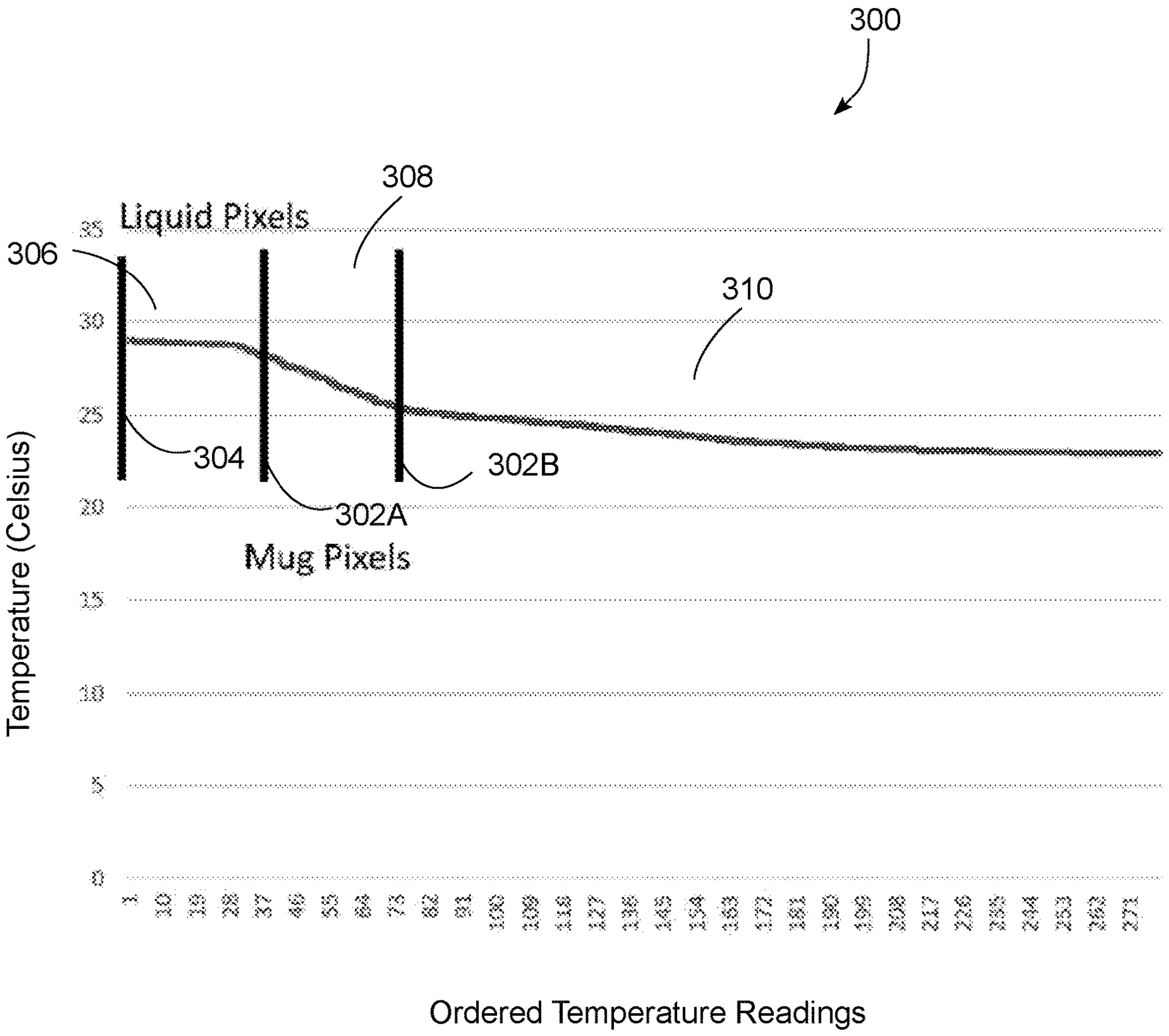
FIG. 3 is a graph depicting an example temperature function suitable for use in detecting a beverage from a thermal image using the microwave cooking appliance of FIGS. 1-2.

FIG. 3, for example, illustrates an example graph 300 of a temperature function determined from a thermal image captured of a beverage in a mug container and having a measured temperature of about 28 degrees Celsius. The example provided in FIG. 3 depicts temperature along the Y-axis and temperature readings along the X-axis. It is important to note that in this graph, the temperature readings are ordered from highest temperature to lowest temperature, and the temperature reading placements along the X-axis are not reflective of their relative locations to one another.

It will be appreciated that the temperature of a liquid, even during heating, is generally relatively homogeneous, as is the temperature of the cooking cavity itself, which is generally constructed of materials that are not affected by microwave radiation. As such, it may be seen that at both the left and right ends of the graph (regions 306 and 310), a relatively small rate of change (i.e., a relatively horizontal slope) is seen in the temperature function, meaning that the temperature readings in these regions are at relatively homogeneous temperatures. As it is known that the beverage in this thermal image has been heated to a temperature above ambient temperature, therefore, it may be assumed that region 306 generally corresponds to temperature readings of the beverage while region 310 generally corresponds to temperature readings of the cooking cavity.

Between these two regions, however, is a region 308 having a relatively greater rate of change from temperature reading to temperature reading (i.e., a relatively more inclined slope), which may be considered to represent the boundary region between the beverage and the cooking cavity. In some instances, at least a portion of region 308 may be considered to represent the temperature readings associated with the container (here a mug) within which the beverage is disposed.

Figure 4:
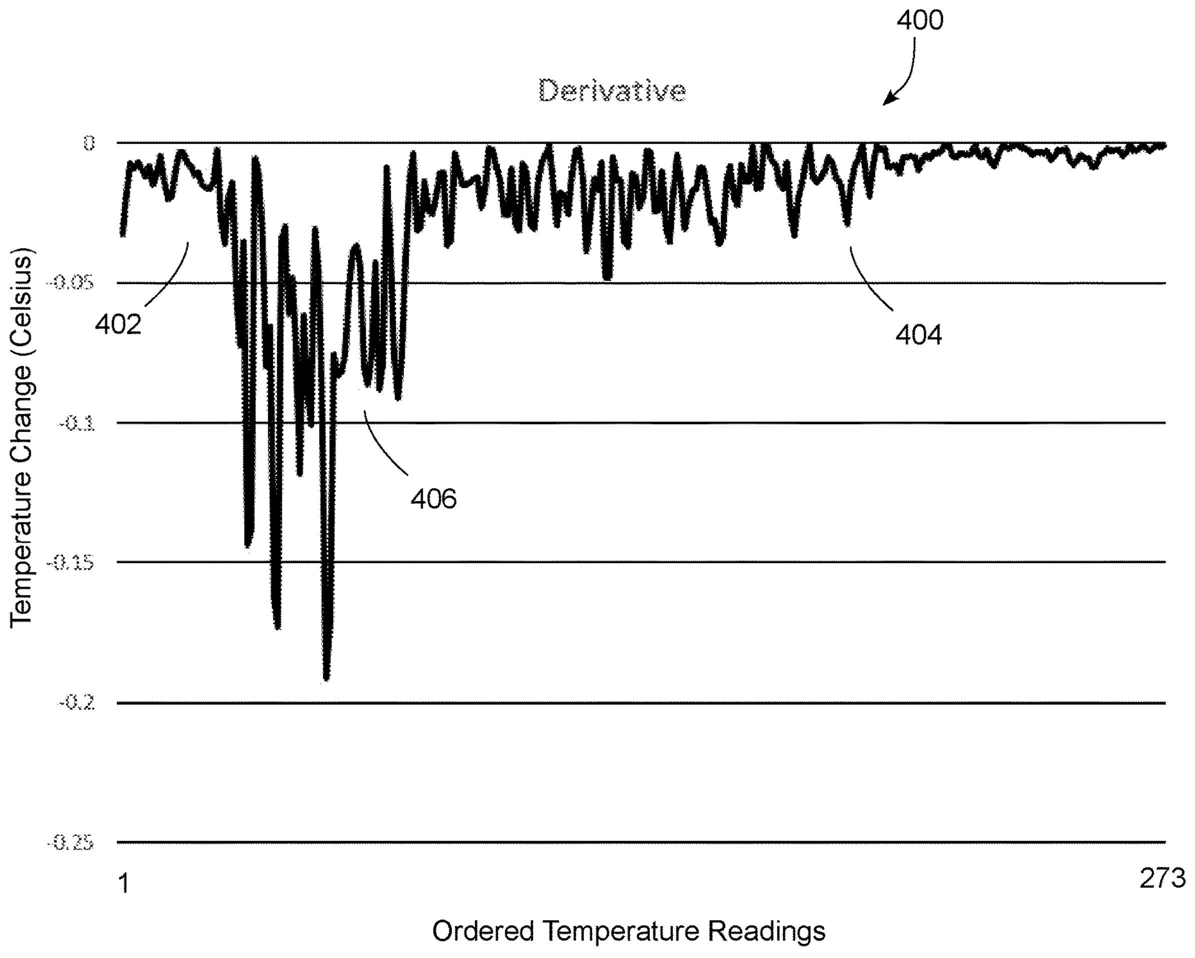
FIG. 4 is a graph depicting an example derivative function calculated from the temperature function of FIG. 3.

It will be appreciated that the differences in the instantaneous rates of change in these various regions in the temperature function may be emphasized by calculating a derivative over the temperature function, and as such, in the illustrated embodiments, a derivative function may be calculated from the temperature function to effectively calculate instantaneous rates of change within the temperature function. FIG. 4, for example, depicts an example graph 400 of a derivative function calculated over the temperature function of FIG. 3. The example provided in FIG. 4 depicts a rate of change along the Y-axis temperature readings along the X-axis. Regions 402, 404 and 406 moreover generally correspond to regions 306, 310 and 308 of FIG. 3. Region 406 of the graph thus depicts relatively greater rates of change (in terms of magnitude) than regions 402 and 404.

Thus, by calculating a derivative function over a temperature function, a region generally corresponding to a boundary between a beverage and a cooking cavity may be detected based upon that region having a relatively greater derivative (in terms of magnitude) than other regions.

The derivative function may then be used to determine a beverage criterion that, when met by a particular location in a thermal image, may result in that location be assigned to the beverage. In some embodiments, for example, the temperature reading having the greatest absolute derivative value may be used as a threshold value, such that any location having a temperature reading that is greater than (or greater than or equal to) the threshold value is determined to be a beverage location, while any location having a temperature reading that is less than (or less than or equal to) the threshold value is determined to not be a beverage location.

In addition, in some embodiments, a separate container criterion may be used such that locations may be assigned to the beverage, the container, or the cooking cavity. FIG. 3, for example, illustrates two boundaries 302A and 302B that could be used for characterizing locations as beverage, container, or cooking cavity, with the temperatures associated with those indices in the graph being used for the two criteria.

Once the locations corresponding to the beverage are known, it may be desirable to select one or more of those locations as sensing locations, which may be considered to be locations in a thermal image from which a temperature for the beverage may be calculated. In some embodiments, for example, it may be desirable to determine a geometric center of the locations assigned to the beverage and select one or more locations proximate the geometric center. In one embodiment, for example, the geometric center may be determined by determining the leftmost and rightmost locations corresponding to the beverage and selecting as an X coordinate the average of the X coordinates of the leftmost and rightmost locations, and determining the topmost and bottommost locations corresponding to the beverage and selecting as a Y coordinate the average of the Y coordinates of the topmost and bottommost locations. Other techniques suitable for determining the geometric center of a contiguous group of pixels or locations may be used in other embodiments, as will be appreciated by those of ordinary skill having the benefit of the instant disclosure.

While a single sensing location may be used in some embodiments, in other embodiments, it may be desirable to use multiple sensing locations and determine the temperature of the beverage based upon an average of the multiple sensing locations. Thus, it may be desirable in some embodiments to select as sensing locations the location nearest the geometric center of the beverage locations along with one or more adjacent locations, and then calculate temperature as an average of the temperature readings of all of the sensing locations.

Once one or more sensing locations are determined, the temperature of the beverage may therefore be determined from a thermal image. Moreover, when multiple thermal images are captured with the beverage in the same orientation in the cooking cavity, the same sensing locations may be reused for all of the thermal images, i.e., the sensing locations may be calculated once and then used to determine temperature without having to re-detect the beverage in later thermal images. In the embodiments described herein, for example, while a turntable is used to rotate the beverage during heating, it is desirable to stop the turntable at the same rotational position before each thermal image capture such that the sensing locations determined for one thermal image will still be applicable for other thermal images. In other embodiments, however, new sensing locations can be calculated for each thermal image.

Figure 5:
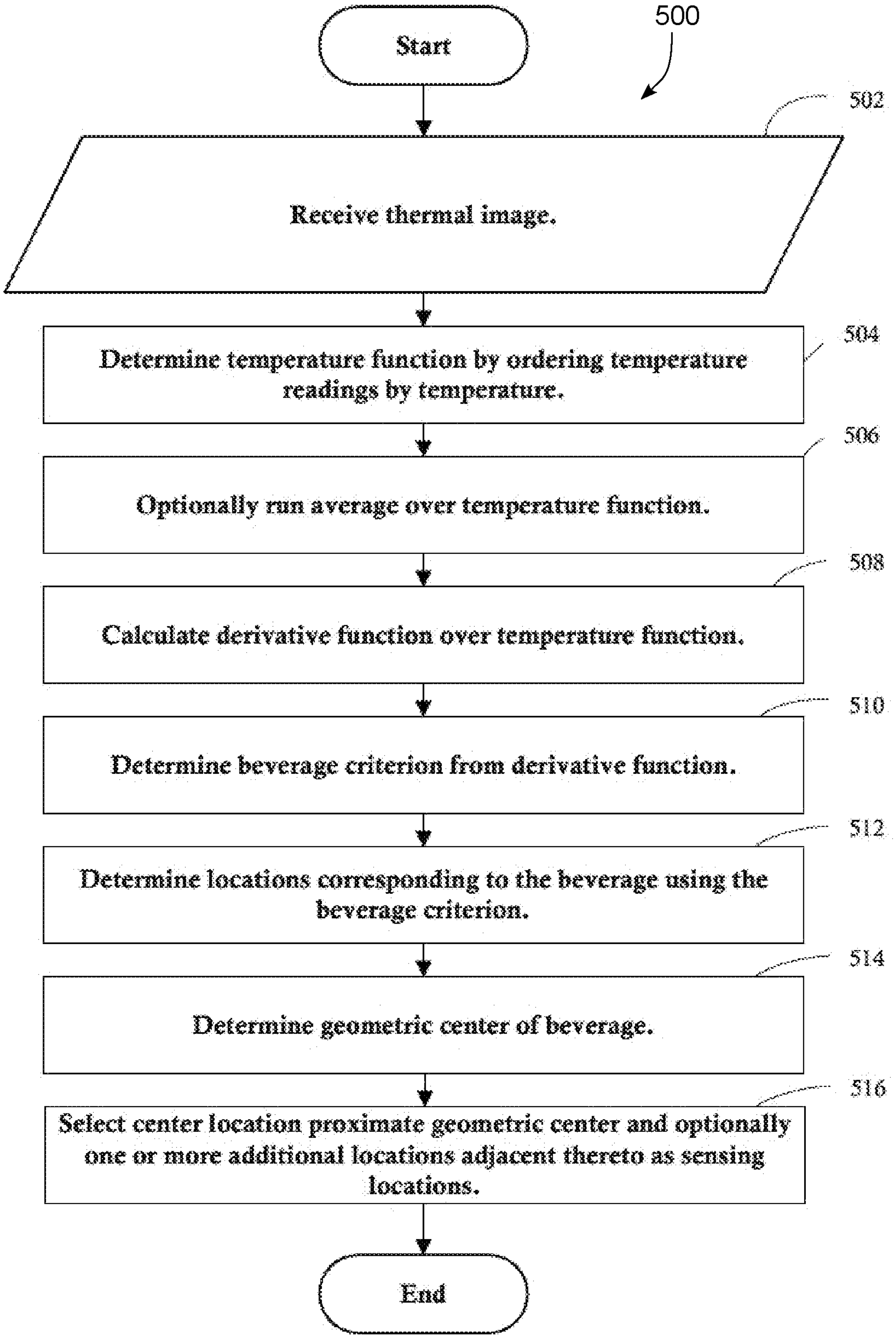
FIG. 5 is a flowchart illustrating an example sequence of operations for determining one or more sensing locations for a beverage from a thermal image using the microwave cooking appliance of FIGS. 1-2.

Now turning to FIG. 5, this figure illustrates a sequence of operations 500 for detecting a beverage sensing location. The beverage detection process may be used in various types of cycles, including for example, the beverage heating cycle illustrated in FIG. 6. Sequence 500 may be initiated, for example, any time it is desirable to locate a beverage in a thermal image captured by a temperature sensor.

As illustrated in block 502, the microwave controller is configured to receive a thermal image including a plurality of temperature readings representing a plurality of locations within a field of view of the temperature sensor. In some embodiments, the thermal image may include a 32×24 array of temperature readings across the field of view for a thermal camera implementation of the temperature sensor.

Then, as illustrated in block 504, a temperature function for the thermal image is determined by ordering temperature readings acquired in block 502 by temperature. In some implementations, the plurality of temperature readings in the thermal image are arranged into a two-dimensional array e.g., as in a 32×24 array of temperature readings. In some implementations, the ordering of the plurality of temperature readings are arranged into a one-dimensional array e.g., the temperature function array.

Next in block 506, an average may optionally be run over the temperature readings in the temperature function, e.g., for each temperature reading, averaging that temperature reading with one or more adjacent temperature readings in the temperature function array. By doing so, the temperature function may be smoothed to reduce temperature reading to temperature reading fluctuations. Also, in some embodiments, curve fitting may be used to generate a mathematical function that approximates the temperature readings in the temperature function array.

Next, in block 508, a derivative is calculated over the temperature function of the ordered array (either in a raw or averaged form) to obtain a derivative function. FIGS. 3-4 and the previous discussion thereof are indicative of the relationship between a temperature function and a derivative function. As discussed, inflection points in the temperature function will be especially apparent in a derivative function thereof. Inflection points can represent a span of locations having a high rate of change of temperature relative to other rates of change between temperatures in the array, allowing for more efficient detection of beverage boundaries.

Following the calculation in block 508, in block 510 a beverage criterion is determined from the derivative function. The beverage criterion may include at least one temperature(s) corresponding to the beverage, though a beverage criterion is not limited to including only a single temperature. For example, beverage criteria may also include surface area (i.e., width or length) of the beverage, based on the temperature readings. In some implementations, the beverage criterion is determined by identifying a point or region of greatest rate of change (in absolute terms) in the calculated derivative function. In some implementations, the beverage criterion is further determined by identifying a temperature within the identified point or region of the greatest rate of change in the calculated derivative function, e.g., by using the corresponding temperature reading at which the greatest rate of change is detected from the derivative function.

In block 512 locations corresponding to a beverage are determined using the beverage criterion. For example, where a temperature reading at which the greatest rate of change is detected from the derivative function is used, each location in the thermal image having a temperature reading that is higher than (or higher than or equal to) that used for the beverage criterion may be assigned to the beverage, and each location that does not meet this criterion may be assigned to the cooking cavity. In some implementations, locations corresponding to an beverage container within which the beverage is contained may also be determined as discussed above.

In block 514, a geometric center corresponding to the beverage is determined. In some embodiments, one or more locations proximate to the determined geometric center may also be determined, e.g., by determining the left, right, top and bottom extents of the group of locations assigned to the beverage and taking the horizontal and vertical midpoints thereof, or in other manners as discussed above.

Next, in block 516, one or more sensing locations are selected. In some implementations one or more sensing locations proximate to the geometric center are selected. For example, in addition to selecting the location(s) determined to be at the geometric center in block 514, one or more surrounding pixel locations may also be selected, and the temperature of the beverage may be determined by averaging the temperature readings from the selected sensing locations.

Figure 6:
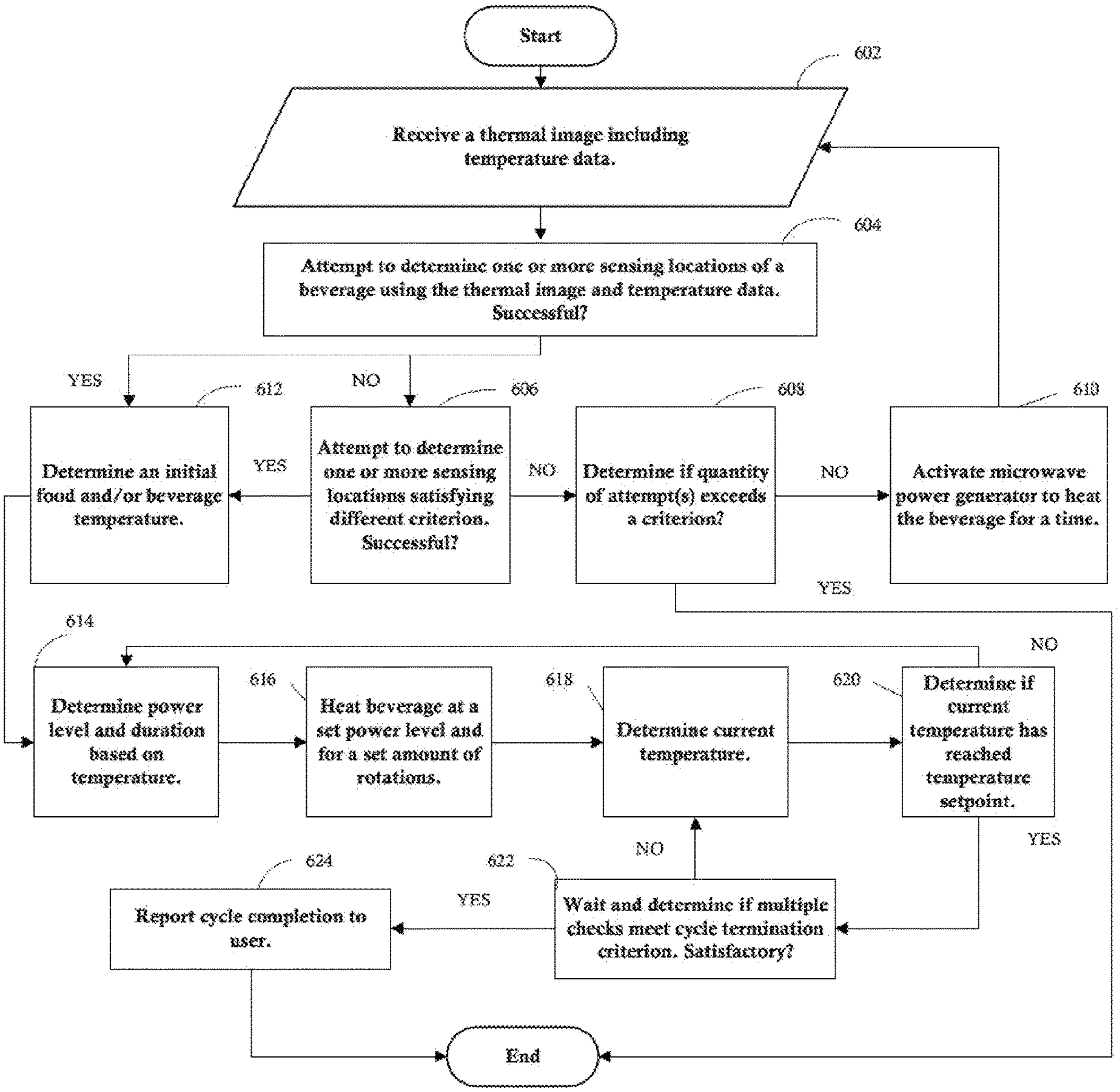
FIG. 6 is a flowchart illustrating an example sequence of operations for heating a beverage in the microwave cooking appliance of FIGS. 1-2.

Now turning to FIG. 6, this figure illustrates a sequence of operations 600 for heating a beverage in the microwave cooking appliance illustrated in FIGS. 1 and 2, and using the beverage detection process such as described above in connection with FIGS. 3-5. Sequence 600 may be initiated, for example, subsequent to a user placing a beverage on the turntable, closing the door, and pressing an appropriate user control (e.g., a "Heat" or "Beverage Warming" button).

As illustrated in block 602, initial temperature data is collected using the temperature sensor. Temperature data may be collected from a thermal image e.g., including a 32×24 array of temperature readings across the field of view for a thermal camera implementation of the temperature sensor. Each reading represents a location within a field of view of the temperature sensor.

Next, in block 604, an attempt is made to determine one or more sensing location(s) for the beverage at least in part based upon the data collected in block 602, e.g., using the beverage detection process discussed above. It will be appreciated, however, that in some instances, a user may place a beverage in the cooking cavity that is either at or near ambient temperature, or may even be below ambient temperature (e.g., in the case that a cup of tap water or a beverage stored in the refrigerator is placed in the cooking cavity for warming). In some embodiments, the beverage detection process described above may fail to identify sensing locations in a thermal image if the temperature of the beverage is not appreciably above ambient temperature. Thus, in such cases it may be desirable to pass control to block 606 attempt to determine the sensing locations based upon a different criterion.

For example, it may be desirable in some embodiments to determine whether the thermal image includes any cold locations, i.e., locations having temperature readings substantially below ambient temperature (e.g., about 20-25 degrees Celsius). In some embodiments, for example, a beverage detection process similar to that described above may be performed, but using a beverage criterion that assigns to the beverage any locations having temperature readings that are below a determined temperature. In addition, with either beverage detection process, shape analysis may also be performed to determine if a region assigned to a beverage is, in fact, shaped like a beverage (e.g., having a circular shape), and if not, to declare the attempt at determining sensing locations to have failed.

If neither attempt is successful, and as will be discussed in greater detail below, it may be desirable to heat the beverage for a predetermined duration to generate a differential between the temperature of the beverage and ambient temperature such that a subsequent beverage detection process is more likely to be successful.

Thus, if the attempted determination of block 606 is unsuccessful, then next in block 608 the current number of attempts is calculated, i.e., the number of times a thermal image has been captured and a beverage detection process has been performed on that thermal image. If the current number of attempts exceeds a quantity of attempts criterion (i.e. there have been too many failed attempts), then the process terminates. If the current number of attempts does not exceed the quantity of attempts criterion, however, then the process continues to block 610 where the beverage is heated.

At block 610 the microwave generator is activated to apply heat to the beverage for a duration of time. In some implementations, the power level and duration will be predetermined. In some implementations, data from an unsuccessful determination in blocks 604 and/or 606 will be used to determine the power level and/or duration (such as when the overall data is too ambiguous to determine enough sensing locations to properly/accurately identify the beverage, but one or more pixels indicate slight variations in temperature in the thermal image that are potentially indicative of the beverage). As illustrated in FIG. 1, the microwave may include a turntable. The power level and/or duration may be further based on characteristics of the turntable, such as the amount of time needed for the turntable to return to a same position once rotated at a speed. Subsequently, the microwave power generator is deenergized, and the sequence of operations returns to block 602 to begin anew. As such, the beverage may be heated one or more times to attempt to locate the beverage in a thermal image, and if there are too many failed attempts, it may be assumed that no beverage is in the cooking cavity and the cycle may be terminated.

Returning to block 604, if an attempt to determine one or more sensing locations is successful, the process continues to block 612. The coordinates or indices of the sensing locations may be stored for recall in a subsequent operation.

At block 612, an initial beverage temperature is determined. The initial beverage temperature is the current temperature of the beverage based on data from block 604 or 606, e.g., using the temperature readings from the sensing locations from the last captured thermal image. In some embodiments, values of beverage temperature readings may be summed and the summation may be divided by the total number of beverage temperature readings summed to determine an average temperature reading relating to all or a portion of the beverage.

At block 614, a power level and duration to activate the microwave power generator are determined, and in block 616, the microwave power generator may be activated for the determined duration and at the determined power level. In some implementations the power level and duration may be determined at least in part based on whether warmer or cooler temperatures are identified during an attempt to determine one or more sensing locations. In some embodiments, microwave power level and/or duration may be determined at least in part based on a predetermined temperature which the beverage is sought to satisfy by the end of the process. In some embodiments, power level and/or duration are determined at least in part based on the current determined temperature of the beverage.

In one embodiment, if cooler pixels are used (i.e. if an attempt using initial attempt criterion is unsuccessful and an attempt using subsequent attempt criterion is successful) the power level may be set to five out of ten power levels and the duration may be set to the amount of time it takes to complete three full rotations of the turntable. In the same embodiment, if the temperature average of the sensing locations is less than about 15 degrees Celsius, then the power level may be set to five out of ten power levels and the duration may be set to the amount of time it takes to complete two full rotations. In the same embodiment, all other heating may be set at a power level of three out of ten power levels and the duration may be set to the amount of time it takes to complete one full rotation. It is appreciated that duration may be controlled in a number of different manners in different embodiments. For example, duration may be specified in terms of numbers of full rotations of the turntable. In other embodiments, however, duration may be specified in other manners, e.g., seconds. The duration, in some embodiments, may be about 1-3 full turntable revolutions, and if the turntable rotation rate is known, may be controlled based upon a timer and without the need for a position sensor. At the end of the duration, the microwave power generator is deenergized and the turntable is stopped.

Next, in block 618, a current temperature of the beverage is determined, e.g., by capturing a thermal image and determining the temperature by averaging together the temperature readings for the determined sensing locations. Of note, in block 618 the sensing locations determined in block 604 or 606 from a prior thermal image may be used to determine the beverage temperature on the later thermal image.

Block 620 then determines if the current temperature has reached a temperature setpoint for the cycle, e.g., a default setpoint set for all beverage warming operations, or alternatively, a custom setpoint set by a user when initiating the cycle. In some embodiments, for example, block 620 may determine whether the current temperature is at least 0.5 degrees greater than the temperature setpoint. If not, control returns to block 614 to initiate another heating cycle, with the power level and duration determined in the manner discussed above based on the current temperature of the beverage.

If so, however, control passes to block 622 to initiate a loop to determine whether a cycle termination criterion has been met. In the illustrated embodiment, the cycle termination criterion is the temperature of the beverage remaining at or above the temperature setpoint for N temperature checks separated by one another in time. In one specific embodiment, for example, a cycle termination criterion may be determined to be met when three separate temperature checks, separated from one another by 10 seconds each confirm the beverage temperature at or above the temperature setpoint.

Thus, in block 622, a delay is initiated to allow the temperature to stabilize, e.g., about 10 seconds in some embodiments, and a determination is made as to whether the desired number of temperature checks have been performed. If not, control returns to block 618 to capture another thermal image and determine the current temperature. If so, however, the cycle termination criterion is met, and control may pass to block. At block 624, an indication is rendered to a user that the cycle has been complete. Subsequently, the process ends.

It will be appreciated that various additional modifications may be made to the embodiments discussed herein, and that a number of the concepts disclosed herein may be used in combination with one another or may be used separately. For example, other beverage detection processes than those described in connection with FIG. 5 and other heating cycles than those described in connection with FIG. 6 may be used in other embodiments. Therefore, the invention lies in the claims hereinafter appended.

As used herein, the word "a" is defined to include "one or more". Additionally, as used herein, the word "criterion" is defined to include "one or more criteria". Further, as used herein the word "range" is defined to be either inclusive or exclusive of the endpoints range. As used herein, the word "threshold" is defined to be either inclusive or exclusive of an endpoint of the threshold.

What is claimed is:

1. A microwave cooking appliance, comprising:

an enclosure including a cooking cavity configured to receive a beverage;

a microwave power generator configured to generate microwave energy for heating the beverage received in the cooking cavity;

a temperature sensor configured to capture thermal images of the cooking cavity and to output, for each thermal image, temperature data representing a plurality of temperature readings for a plurality of locations within a field of view of the temperature sensor; and a controller coupled to the microwave power generator and the temperature sensor and configured to perform a cycle to heat the beverage received in the cooking cavity by:

receiving a first thermal image captured by the temperature sensor;

attempting to determine one or more sensing locations corresponding to the beverage from among the plurality of locations within the field of view of the temperature sensor using the temperature data for the first thermal image;

in response to successfully determining the one or more sensing locations:

activating the microwave power generator for one or more phases to heat the beverage to a predetermined temperature; and monitoring a current temperature of the beverage by receiving a second thermal image captured by the temperature sensor and determining the current temperature for the beverage using the temperature readings in the second thermal image corresponding to the determined one or more sensing locations; and in response to unsuccessfully determining the one or more sensing locations:

activating the microwave power generator to heat the beverage for a predetermined duration;

receiving a third thermal image captured by the temperature sensor after activating the microwave power generator to heat the beverage for the predetermined duration; and determining the one or more sensing locations corresponding to the beverage from among the plurality of locations within the field of view of the temperature sensor using the temperature data for the third thermal image.

2. The microwave cooking appliance of claim 1, wherein the controller is configured to attempt to determine the one or more sensing locations corresponding to the beverage from among the plurality of locations within the field of view of the temperature sensor using the temperature data for the first thermal image by:

attempting to determine a first region of locations in the first thermal image having temperature readings above ambient temperature;

in response to successfully determining the first region of locations in the first thermal image having temperature readings above ambient temperature, determining the one or more sensing locations corresponding to the beverage from the first region of locations; and in response to unsuccessfully determining the first region of locations in the first thermal image having temperature readings above the ambient temperature, attempting to determine a second region of locations in the first thermal image having temperature readings below ambient temperature and determining the one or more sensing locations corresponding to the beverage from the second region of locations.

3. The microwave cooking appliance of claim 1, wherein the microwave cooking appliance further comprises a turntable, and wherein the controller is configured to capture each of the first, second and third thermal images when the turntable is in substantially the same rotational position.

4. The microwave cooking appliance of claim 3, wherein the controller is configured to activate the microwave power generator for the one or more phases by, during a first phase of the one or more phases, activating the microwave power generator for a duration corresponding to one or more full rotations of the turntable.

5. The microwave cooking appliance of claim 4, wherein the controller is configured to select the duration and an output level for activating the microwave power generator during the first phase based upon an initial temperature determined for the beverage.

6. The microwave cooking appliance of claim 1, wherein the controller is configured to attempt to determine the one or more sensing locations corresponding to the beverage by:

determining a temperature function for the first thermal image by ordering the plurality of temperature readings for the first thermal image by temperature;

determining a subset of the plurality of locations corresponding to the beverage by calculating a derivative function over at least a portion of the temperature function; and selecting the one or more sensing locations from the determined subset of the plurality of locations corresponding to the beverage.

7. The microwave cooking appliance of claim 6, wherein the controller is configured to determine the subset of the plurality of locations corresponding to the beverage by determining a beverage criterion using the calculated derivative function and assigning each location in the plurality of locations having a temperature reading that meets the beverage criterion to the subset of the plurality of locations corresponding to the beverage.

8. The microwave cooking appliance of claim 7, wherein the controller is configured to determine the beverage criterion by identifying a region of greatest rate of change in the temperature function using the calculated derivative function.

9. The microwave cooking appliance of claim 6, wherein the controller is further configured to determine a geometric center of the subset of the plurality of locations corresponding to the beverage and to select the one or more sensing locations by selecting a center location corresponding to the determined geometric center.

10. The microwave cooking appliance of claim 9, wherein the controller is further configured to determine one or more adjacent locations to the determined center location and to select the one or more sensing locations by selecting the determined one or more adjacent locations.

11. The microwave cooking appliance of claim 6, wherein the controller is configured to determine the temperature function further by averaging each temperature reading for the first thermal image with one or more adjacent temperature readings for the first thermal image after ordering the plurality of temperature readings for the first thermal image by temperature.

12. The microwave cooking appliance of claim 6, wherein the controller is further configured to determine an additional subset of the plurality of locations corresponding to a beverage container within which the beverage is contained in the cooking cavity using the calculated derivative function.

13. The microwave cooking appliance of claim 6, wherein the plurality of temperature readings of the first thermal image are arranged in a two-dimensional array, and wherein the controller orders the plurality of temperature readings for the first thermal image by temperature by arranging the plurality of temperature readings for the first thermal image into a one-dimensional array.

14. The microwave cooking appliance of claim 8, wherein the controller is configured to determine the beverage criterion further by identifying a temperature within the identified region of greatest rate of change in the calculated derivative function.

15. The microwave cooking appliance of claim 1, wherein the controller is configured to determine the one or more sensing locations corresponding to the beverage from among the plurality of locations within the field of view of the temperature sensor using the temperature data for the third thermal image by:

determining a temperature function for the third thermal image by ordering the plurality of temperature readings for the third thermal image by temperature;

determining a subset of the plurality of locations corresponding to the beverage by calculating a derivative function over at least a portion of the temperature function; and selecting the one or more sensing locations from the determined subset of the plurality of locations corresponding to the beverage.

16. The microwave cooking appliance of claim 15, wherein the controller is configured to determine the subset of the plurality of locations corresponding to the beverage by determining a beverage criterion using the calculated derivative function and assigning each location in the plurality of locations having a temperature reading that meets the beverage criterion to the subset of the plurality of locations corresponding to the beverage.

17. The microwave cooking appliance of claim 16, wherein the controller is configured to determine the beverage criterion by identifying a region of greatest rate of change in the calculated derivative function and identifying a temperature within the identified region of greatest rate of change in the calculated derivative function.

18. The microwave cooking appliance of claim 15, wherein the controller is further configured to determine a geometric center of the subset of the plurality of locations corresponding to the beverage and to select the one or more sensing locations by selecting a center location corresponding to the determined geometric center.

19. The microwave cooking appliance of claim 18, wherein the controller is further configured to determine one or more adjacent locations to the determined center location and to select the one or more sensing locations by selecting the determined one or more adjacent locations.

20. The microwave cooking appliance of claim 15, wherein the controller is configured to determine the temperature function for the third thermal image further by averaging each temperature reading for the third thermal image with one or more adjacent temperature readings for the third thermal image after ordering the plurality of temperature readings for the third thermal image by temperature.

* * * * *